Sept. 11, 1956     W. M. REESE     2,762,391
DIFFERENTIAL PRESSURE RESPONSIVE DEVICE
Filed Feb. 18, 1954
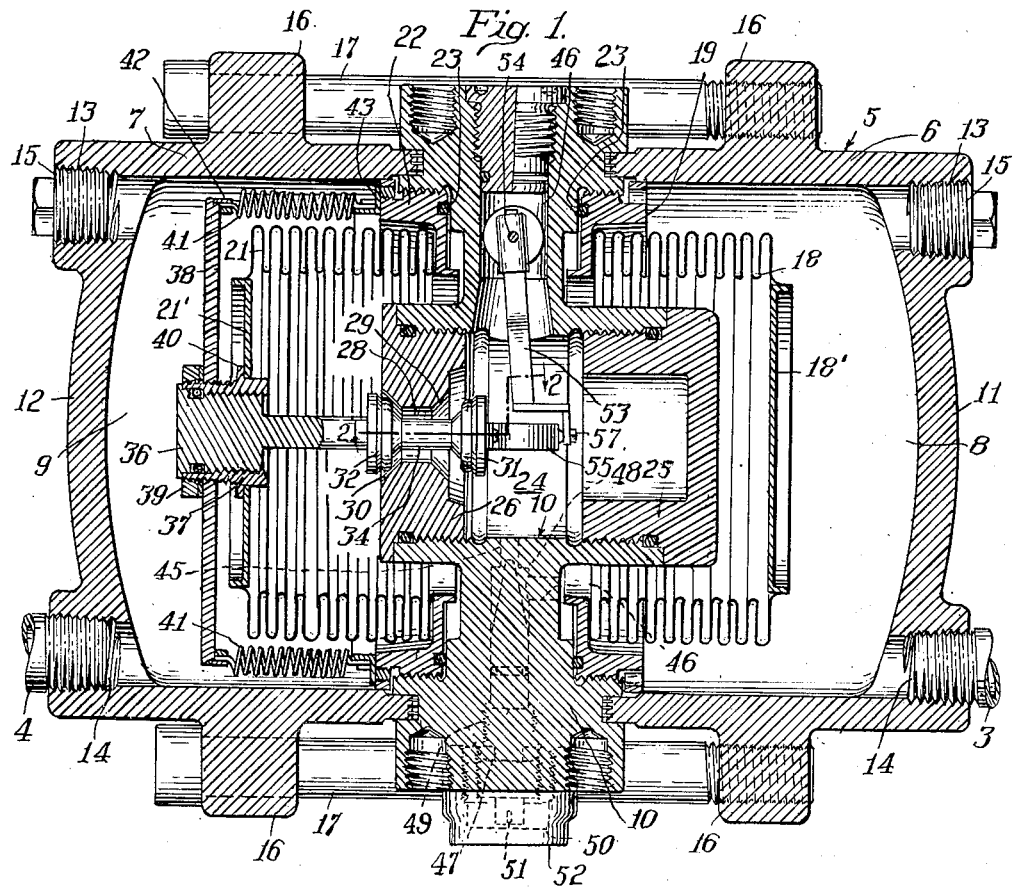
Fig. 1.
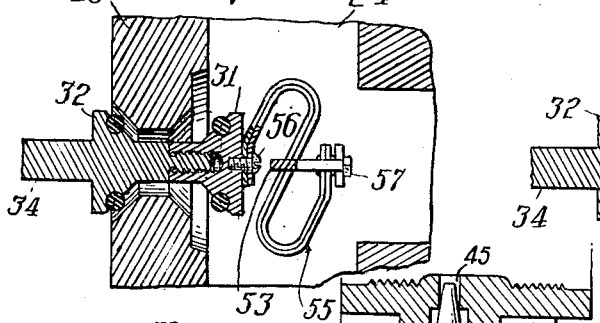
Fig. 2.
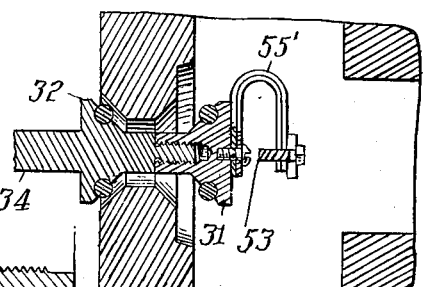
Fig. 3.
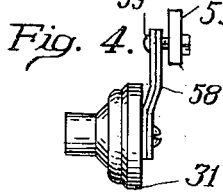
Fig. 4.
Fig. 5.
INVENTOR
William M. Reese
BY
ATTORNEY United States Patent Office 2,762,391
Patented Sept. 11, 1956

2,762,391

DIFFERENTIAL PRESSURE RESPONSIVE DEVICE

William M. Reese, Odessa, Tex., assignor to Industrial Instrument Corporation, Odessa, Tex., a corporation of Texas Application February 18, 1954, Serial No. 411,039

9 Claims. (Cl. 137—779)

This invention relates to improvements in differential pressure responsive devices of the character used for measuring pressures in different environments such, for instance, as the drop in pressure through an orifice plate in a flow line or between separate chambers, and for other purposes.

It has been proposed heretofore to construct a differential pressure responsive device of the character described, which uses two opposed bellows mounted on a center plate and adapted for open communication with each other through a passageway controlled by suitable valves. The pressures to be measured are applied respectively to the exteriors of the two bellows, and the bellows move in response thereto, and one of these bellows controls the pressure responsive element such, for instance, as a meter, indicator or recorder.

The bellows normally are filled with an incompressible liquid which, nevertheless, is subject to expansion by variations in temperature. When the device is used in conditions where there may be a substantial fluctuation of temperature, the expansion or contraction of the liquid confined within the bellows may cause an erroneous action of the responsive instrument. However, some of the expansion or contraction is taken up by the free bellows, but under extreme conditions, a variation in the transmission of force may be produced in accordance with a substantial variation in temperature.

One object of this invention is to improve the contraction of the differential pressure responsive device by compensating for variations in temperature that may be encountered, as affecting the expansion or contraction of the liquid in the instrument, which otherwise may produce an erroneous action of the responsive element.

A further object of the invention is to provide a thermostatic element or device, connected with the responsive element, such as an indicator, recorder, etc., and preferably connected between the bellows actuated means and such responsive device, which element will compensate for variations in expansion or contraction of the liquid in the device as a result of variations in temperature and thereby assure uniform operation of the responsive element, regardless of very substantial variations of temperature.

These objects may be accomplished according to one embodiment of this invention by providing a thermostatic device connected between the valve stem that is attached to the responsive bellows and the responsive instrument actuated thereby, so as to vary in direct proportion to the contraction or expansion of the liquid by variations in temperature. A bi-metallic element, or other suitable thermostatic device, may be connected therein for this purpose, which, preferably, has sufficient adaptability to a wide range of temperature variations such as from zero to 120° F. or from 0° to 300° F. or from 100° F. to 300° F.

These embodiments of the invention are illustrated in the accompanying drawings in which:

Fig. 1 is a longitudinal section through a differential pressure responsive device embodying this invention;

Fig. 2 is a detailed cross-section therethrough, substantially on the line 2—2 in Fig. 1;

Fig. 3 is a similar view, showing a modified form of the thermostatic element;

Fig. 4 is a detailed side elevation showing still another modification thereof; and Fig. 5 is a detail section through the by-pass passage.

While the invention is adapted for many uses as a differential pressure responsive device, for measuring, controlling or indicating pressure differentials, one embodiment of the invention is illustrated as a differential flow meter to measure the drop in pressure through an orifice plate in a flow line. A typical gas or liquid flow line is provided with an orifice plate therein. Connected with the flow line on opposite sides of the orifice plate are pipes 3 and 4, respectively, which extend to the differential pressure responsive device constituting this invention, being connected, respectively, with the high and low pressure chambers thereof.

The embodiment of this device which is illustrated in the drawings comprises a housing generally indicated at 5, the construction of which is shown in Fig. 1. The housing 5 includes a high pressure cylinder or body 6 and a corresponding low pressure cylinder or body 7 arranged in axial alignment with each other and enclosing, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of the same or of different diameters as, for instance, one-quarter inch and one-half inch, respectively. One set of the openings is connected with the pipes 3 and 4, while the other set is closed by plugs 15. Either set of tapped connector openings may be used according to the size of pipes to be connected therewith.

Each of the cylinders or bodies 6 and 7 is provided with radially disposed flanges or lugs 16 for connecting together the cylinders or bodies 6 and 7 through cap screws or tie bolts 17. Several such tie bolts may be used as required.

Mounted within the high pressure chamber 8 is a bellows 18 closed at its outer end by a plate 18' and exposed externally to the pressure within the high pressure chamber 8. The inner end of the bellows 18 is sealed to a nut 19 screw-threaded into a countersunk portion in the adjacent lateral face of the center plate 10. A sealing ring is shown at 23, preferably an O-ring, which effects a complete sealing from the inside of the bellows 18 around the periphery of the nut 19 into the chamber 8.

Mounted in the low pressure chamber 9 is a bellows 21 closed at its outer end by a plate 21', the periphery of which bellows is exposed to the pressure in the chamber 9. The inner end of the bellows 21 is sealed to a nut 22 screw-threaded into a recessed portion of the center plate 10 and provided with a peripheral seal at 23, corresponding with the connection at 19—23 described above.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth in response to variations in pressure in the chambers 8 and 9.

The center plate 10 is provided with an axial passageway therethrough, formed with a cored out chamber 24. The axial passageway is closed by plugs 25 and 26 at opposite ends thereof, preferably screw-threaded into opposite sides of center plate 10 and sealed thereto. This plug 25 forms a cap over the chamber 24 at the adjacent side of the center plate 10 and closes the chamber 24 against direct open communication with the interior of the high pressure bellows 18.

The plug 26 has a passageway 28 therethrough provided with high and low pressure valve seats 29 and 30, respectively, at opposite ends of said passageway, adapted to be engaged alternatively by valves 31 and 32, respectively, on a valve stem 34. The valves 31 and 32 are fixed to each other with their opposed faces spaced apart a distance greater than the distance between the valve seats 29 and 30 so that only one of these valves will engage its seat at a time and both valves may be open at the same time, as illustrated in Fig. 1. O-ring seals may be provided in the faces of the valves 31 and 32 for sealing the valves against the seats 29 and 30, respectively, or any other sealing means desirable may be used for this purpose.

The valve stem 34 is carried by a plug 36 screw-threaded into a sleeve 37 secured rigidly to a plate 38. A lock nut 39 may be used to hold the sleeve 37 securely in the plate. At its inner end, the sleeve 37 is provided with a surrounding flange 40 against which the end plate 21' of the bellows 21 abuts in seated relation therewith.

The plate 38 normally is pressed in an inward direction by range springs 41 spaced at intervals around the periphery of the low pressure bellows 21. Each of the range springs 41 is secured at one end to a peripheral ring connection 42 on the plate 38 and at its opposite end to a similar ring connection 43 secured to the adjacent lateral face of the nut 22 so as to extend parallel with the axis of the bellows 21 and normally tending to contract the latter and to move the valve 32 toward a closed or seated position.

The center plate 10 is provided with a by-pass passage (see Fig. 5) from the chamber 24 therein into the high pressure bellows 18. This by-pass passage is formed by a radial passage 45 in the center plate 10, open at one end to the chamber 24 and having a lateral outlet 46 into the high pressure bellows 18. These passages 45 and 46 will allow the free circulation of liquid from the chamber 24 which may be in open communication with the low pressure bellows 21 into the high pressure bellows 18.

This communication may be controlled by a pulsation dampener restriction valve 47 which is of the needle type, normally adjustable and adapted to engage a seat 48 intermediate the passages 45 and 46 to control the opening therebetween and communication therethrough. The valve 47 is adjustably mounted at 49 in the plate 10 and is held in place by a nut 50 screw-threaded into a projecting portion of the plate, as shown in Fig. 1. The extreme outer end of the valve 47 may be provided with a screw driver slot 51 or with other suitable means to be engaged for adjustment thereof when desired. A cap 52 closes the outer end of the valve and is removable for access thereto. This valve 47 is adapted to be seated in a predetermined position so as to permit normal flow of liquid from one bellows to the other, but to restrict excessive flow due to greatly increased pressures. The normal flow between the bellows is controlled by the valves 31 and 32, being moved in accordance with the relative pressures in the high and low pressure bellows 18 and 21.

The valve stem 34 is adapted for connection with an arm 53 which extends downwardly in the chamber 24 of the center plate 10 from a shaft 54 at its upper end. The shaft 54 extends through a non-freezing bearing of the type set forth in my application, Serial No. 210,132, filed February 9, 1951, now Patent No. 2,712,968, granted July 12, 1955. The shaft 54 may be connected with any suitable indicator, recorder or other device, which it may be desirable to actuate in response to the differential of pressure connected with the chambers 8 and 9.

The bellows 18 and 21 normally are filled with an incompressible liquid. Any variations in temperature which would change the volume of the liquid naturally would affect the operation of the arm 53, so long as a thermostatic liquid is used. While the free bellows 18 will compensate to a substantial extent for fluid expansion or contraction, a greater degree of control can be obtained by a thermostatic device connected between the valve stem 34 and the arm 53 so that any variations of temperature acting on the liquid in the bellows will affect the absolute zero of the instrument connected therewith.

One form of thermostatic element is illustrated in Fig. 2 and designated generally at 55. This is in the form of a bi-metallic bar connected at one end, as by a screw 56, with the outer end of the valve stem 34, substantially at the outer face of the valve 31, while the opposite end of the element 55 is connected at 57 with the arm 53 at the free end of the latter. The thermostatic element 55 is shown in a plurality of loops, the number of which may be increased as desired according to the length needed to compensate for variations in temperature, or the number of loops may be reduced to a single loop, as indicated at 55' in Fig. 3.

Other types of thermostatic elements may be used as desired, either U-shaped or looped, or even a straight bar, as shown at 58 in Fig. 4, the upper end of which is connected through a loose connection 59 with the lower end of the arm 53, while the lower end of the element 58 is in turn secured to the adjacent end of the valve stem 34, or the valve 31. Thus, it will be apparent that the actual construction of the thermostatic element may differ materially, but a suitable form thereof will compensate for variations in temperature as affecting the volume of the liquid contained in the bellows. As the liquid expands, the thermostatic element will also expand, and thereby maintain the absolute zero of the instrument affected thereby, and conversely, the thermostatic element will contract upon a contraction of the thermostatic liquid in the bellows to compensate for this variation. It is thus possible to use the instrument in wide variations of temperature, as from zero to 120° F.

In other respects the construction and operation of this device is substantially the same as set forth and claimed in my previous applications Serial No. 323,885, filed December 3, 1952, and Serial No. 384,608, filed October 7, 1953.

While the invention has been illustrated and described in certain embodiments, it is recognized that other variations and changes may be made therein without departing from the invention as set forth in the claims.

I claim:

1. In a differential pressure responsive device, a housing having a pressure chamber therein, a bellows and additional means having a portion exposed to said pressure chamber, said bellows and additional means enclosing a liquid, means operatively connected with the bellows and movable thereby in response to variations in pressure acting on the bellows, and thermostatic means connected with said operative means in heat exchange relation with the liquid and compensating for variations in volume of the liquid by variations in temperature acting on the liquid and on the thermostatic means.

2. In a differential pressure responsive device, a housing having a pressure chamber therein, a bellows and additional means having a portion exposed to said pressure chamber, said bellows and additional means enclosing a liquid, means operatively connected with the bellows and movable thereby in response to variations in pressure acting on the bellows, and thermostatic means connected with said operative means in the liquid in heat exchange relation therewith and compensating for variations in volume of the liquid by variations in temperature acting on the liquid and on the thermostatic means, said operative means having valve means connected therewith to control the action of the liquid on the bellows.

3. In a differential pressure responsive device, a housing having pressure chambers therein, bellows having portions exposed to said pressure chambers and enclosing a liquid, means operatively connected with one of the bellows and movable thereby in response to variations in pressure acting on the bellows, thermostatic means connected with said operative means in the liquid in heat exchange relation therewith and compensating for variations in volume of the liquid by variations in temperature, and responsive means connected with the thermostatic means and operative thereby to create action in response to movement of said one of the bellows through movement of the operative means and thermostatic means applied thereto.

4. In a differential pressure responsive device, a housing having a pressure chamber therein, a bellows having a portion exposed to said pressure chamber, means in open communication with said bellows and jointly therewith enclosing a liquid, means operatively connected with the bellows and movable thereby in response to variations in pressure acting on the bellows, valve means connected with the operative means and movable thereby to control the action of the liquid on the bellows, movement transmitting means arranged for action thereon by the operative means to move the transmitting means in response to motion by the bellows, and thermostatic means in heat exchange relation with the liquid and connecting the operative means with the transmitting means.

5. In a differential pressure responsive device, a housing having a pressure chamber therein, a bellows having a portion exposed to said pressure chamber, means in open communication with said bellows and jointly therewith enclosing a liquid, a valve stem operatively connected with the bellows and movable thereby in response to variations in pressure acting on the bellows, valve means connected with the valve stem for controlling the action of the liquid on the bellows, a motion transmitting arm, and thermostatic means in heat exchange relation with the liquid and connecting the valve stem with the motion transmitting arm for varying the connection therebetween in response to variations in the liquid due to temperature changes.

6. In a differential pressure responsive device, a housing having a pressure chamber therein, a bellows having a portion exposed to said pressure chamber, means in open communication with said bellows and jointly therewith enclosing a liquid, a valve stem operatively connected with the bellows and movable thereby in response to variations in pressure acting on the bellows, valve means connected with the valve stem for controlling the action of the liquid on the bellows, a motion transmitting arm, and thermostatic means in heat exchange relation with the liquid and connecting the valve stem with the motion transmitting arm for varying the connection therebetween in response to variations in the liquid due to temperature changes, said thermostatic means comprising a bi-metallic member connected at one end with the valve stem and at the opposite end with the motion transmitting member.

7. In a differential pressure responsive device, a housing having pressure chambers therein, a center plate arranged between the chambers, bellows mounted in the respective chambers and having their inner ends secured to the center plate and their outer ends free for movement relative thereto, means of communication between the interiors of the bellows, said bellows being filled with a liquid for flow of liquid therebetween through said means, valve means for controlling said flow, a valve stem connected with the valve means and with one of the bellows to move the valve means in response to the action of the liquid thereby, a motion transmitting arm, and thermostatic means in heat exchange relation with the liquid and forming an operating connection between the valve stem and the arm and varying the relation therebetween in response to variations in temperature.

8. In a differential pressure responsive device, a housing having pressure chambers therein, a center plate arranged beetween the chambers, bellows mounted in the respective chambers and having their inner ends secured to the center plate and their outer ends free for movement relative thereto, means of communication between the interiors of the bellows, said bellows being filled with a liquid for flow of liquid therebetween through said means, valve means for controlling said flow, a valve stem connected with the valve means and with one of the bellows to move the valve means in response to the action of the liquid thereby, a motion transmitting arm, and thermostatic means in heat exchange relation with the liquid and forming an operating connection between the valve stem and the arm and varying the relation therebetween in response to variations in temperature, said thermostatic means comprising a bi-metallic member connected at one end with the valve stem and at the opposite end with the motion transmitting member.

9. In a differential pressure responsive device, a housing having a pressure chamber therein, a flexible device mounted in the pressure chamber and having a portion thereof exposed to said pressure chamber with a liquid in said flexible device acting in opposition to the pressure in the chamber on the flexible device, a motion transmitting member, and thermostatic means in heat exchange relation with the liquid connecting said motion transmitting member with the flexible device and varying the relation therebetween in response to variations in the volume of the liquid by variations in temperature.

References Cited in the file of this patent

UNITED STATES PATENTS

| | | |
|---|---|---|
| 2,166,595 | Jenny | July 18, 1939 |
| 2,185,578 | Beardsley et al. | Jan. 2, 1940 |
| 2,590,324 | Jones | Mar. 25, 1952 |
| 2,628,501 | Knapp | Feb. 17, 1953 |
| 2,632,474 | Jones | Mar. 24, 1953 |
| 2,659,390 | MacLea et al. | Nov. 17, 1953 |